United States Patent [19]

Schick

[11] Patent Number: 4,671,403
[45] Date of Patent: Jun. 9, 1987

[54] FLEXIBLE PIN FOR COUPLING AND ARTICULATION OF FASTENING STAPLES OF A CONVEYOR BELT

[75] Inventor: Jean-François Schick, Paris, France

[73] Assignee: Goro S.A., Chelles, France

[21] Appl. No.: 743,893

[22] Filed: Jun. 12, 1985

[30] Foreign Application Priority Data

Jun. 26, 1984 [FR] France .................. 8410026

[51] Int. Cl.$^4$ ............................ B65G 15/30
[52] U.S. Cl. .................. 198/844; 24/33 P; 474/255
[58] Field of Search ............ 198/844, 846, 847; 24/31 R, 31 F, 31 H, 31 W, 33 A, 33 B, 33 C, 33 M, 33 P; 474/253, 255, 256, 260, 261, 262, 268; 403/229

[56] References Cited

U.S. PATENT DOCUMENTS

| | | | |
|---|---|---|---|
| 2,370,884 | 3/1945 | Smith | 403/220 |
| 3,319,217 | 5/1967 | Phillips | 24/33 P |
| 4,023,239 | 5/1977 | Stolz | 198/846 |
| 4,024,605 | 5/1977 | Henke | 198/844 |
| 4,315,349 | 2/1982 | Stolz | 24/31 H |
| 4,344,209 | 8/1982 | Harwood | 198/844 |

*Primary Examiner*—Joseph E. Valenza
*Attorney, Agent, or Firm*—Young & Thompson

[57] ABSTRACT

A flexible hinge-pin for coupling two complementary rows of fastening staples on the opposite ends of closed-loop conveyor belt or the like comprises a flexible central core such as a steel cable. The core is surrounded successively by an intermediate plastic sheath and a tubular outer jacket formed by twisting one or a number of strands of wire, either in the same direction of twist as the core or in the opposite direction. The intermediate sheath can be of plastic material filled with grease which is capable of flowing under the action of the relative movements of the hinge-pin components at the time of flexural deformation of the pin in order to ensure that a fraction of the grease spreads over the surface of the pin.

3 Claims, 6 Drawing Figures

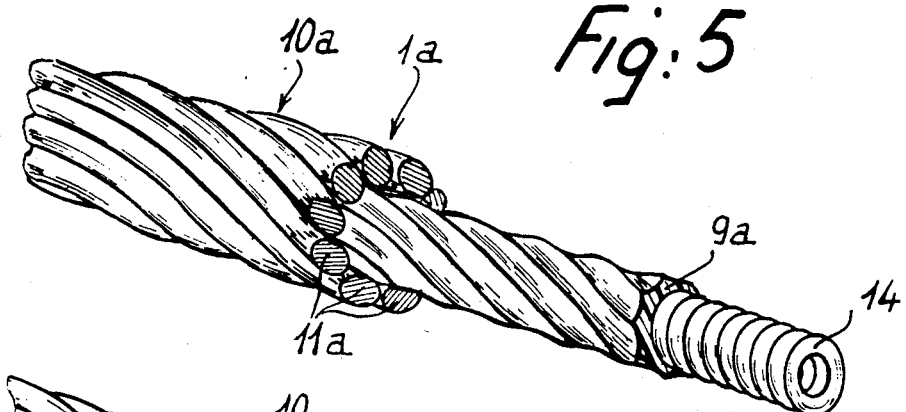
Fig: 5
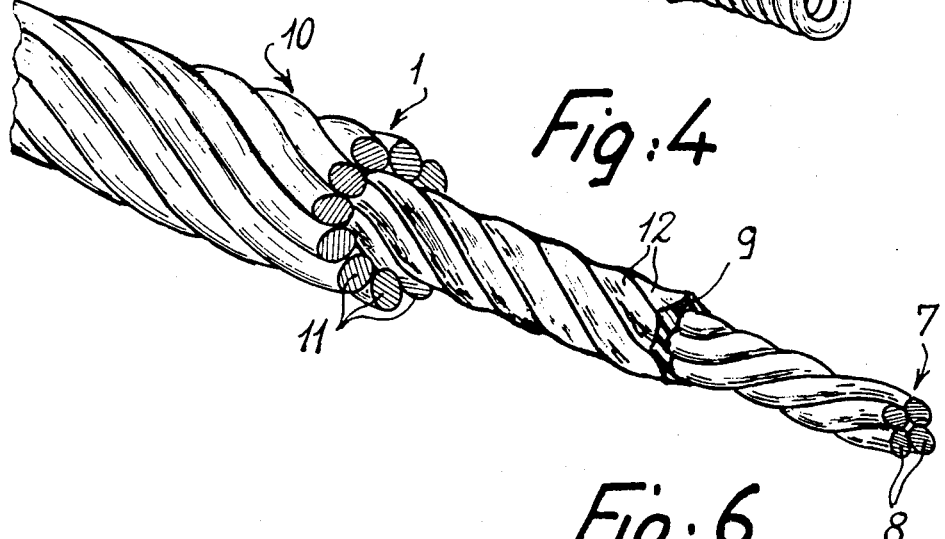
Fig: 4
Fig: 6

FLEXIBLE PIN FOR COUPLING AND ARTICULATION OF FASTENING STAPLES OF A CONVEYOR BELT

BACKGROUND OF THE INVENTION

1. Field of the Invention

The present invention relates to the joining of conveyor belts by means of two rows of metallic fastening staples which are coupled together by means of a hinge-pin.

2. Description of the Prior Art

The staples employed for this purpose consist of U-shaped elements which are intended to be placed astride each end of a conveyor belt in order to be secured by means of metallic clamps or any other suitable elements. These coupling staples are provided with U-shaped hinge-ends placed in a projecting position with respect to the edge of the corresponding end of the conveyor belt. The arrangement is such that the hinge-ends of two complementary rows can be disposed in interjacent relation in order to be coupled by engagement of a coupling pin within the passageway formed by said U-shaped hinge-ends.

Said coupling pin therefore permits articulation of the two corresponding rows of staples as the conveyor belt passes over a driving drum or guide drum. However, it is necessary to ensure that the coupling pin is capable of flexural deformation in the transverse direction so that the belt can accordingly assume the shape of a trough on the rollers of a conveyor when it is in service. It is for this reason that coupling pins of this type are usually constituted by a cable of twisted wire strands.

However, coupling pins of this type are subjected to high friction forces as a result of the articulation of the hinge-ends of the staples on said pins. This produces rapid wear of the coupling pins. Furthermore, there is a considerable danger of seizure of the staple hinge-ends on said coupling pins.

In an attempt to overcome these disadvantages, it has been proposed to provide around coupling pins of this type rotatable sleeves or the like which are thus interposed between the staple hinge-ends and the corresponding pin. One solution of this type is described in German patent Application No. 25 07 474. However, a solution of this type suffers from the disadvantage of being particularly costly. Furthermore, it provides only an imperfect answer to the problem under consideration, particularly as the presence of the rotatable sleeves thus provided is attended by a drawback in that the sleeves reduce the flexibility of the hinge-pin.

For the reason stated in the foregoing, the aim of the present invention is to produce a coupling pin so designed as to permit good articulation of the hinge-ends of the staples while nevertheless providing a satisfactory degree of flexibility.

SUMMARY OF THE INVENTION

To this end, the invention is directed to a flexible coupling pin having a flexible central core which can be constituted by a metallic cable or the like. The distinctive feature of the invention lies in the fact that the following components are provided successively around said core:

an intermediate sheath which is formed of flexible plastic material and completely surrounds the inner core, an outer jacket of tubular shape and formed by twisting one or a number of single strands of wire which may be of steel or of any other suitable metal, said outer jacket being twisted either in the same direction or in the opposite direction with respect to the direction of twist of the inner core.

Thus the mechanical strength of the inner core of said coupling pin is enhanced by means of the outer jacket provided around said core. However, the nature of said jacket is such that it does not impair the flexibility of the coupling pin. Moreover, the subdivision of said coupling pin into two separate and distinct elements, namely the inner core and the outer jacket, is conducive to flexural deformation of the pin since these two elements are thus capable of sliding one over the other while they are being subjected to a bending stress. However, as a result of interposition of the intermediate plastic sheath, there is no potential danger of seizure of the two aforementioned elements with respect to each other. This is an essential advantage since any seizure would have the effect of preventing normal displacement in relative sliding motion and would be liable to result in premature wear of these elements.

In an advantageous embodiment, the intermediate sheath of the coupling pin under consideration is formed of plastic material filled with grease or with hard grease which is capable of flowing under the action of the relative movements of the different constituent elements of said coupling pin at the time of flexural deformation of said pin in order to ensure that a fraction of said grease spreads over the surface of said pin. The lubrication thus obtained has the advantage of guarding against any danger of seizure of the hinge-ends of the coupling staples on the coupling pin under consideration. Furthermore, this lubrication permits good articulation of said hinge-ends without premature wear of the coupling pin.

BRIEF DESCRIPTION OF THE DRAWINGS

Other features of the invention will be more apparent upon consideration of the following description and accompanying drawings, wherein:

FIGS. 4 and 5 are views in perspective with portions broken away and showing two different embodiments of the flexible coupling pin in accordance with the invention;

FIG. 6 is a schematic view in perspective illustrating the conditions of flexural deformation of the coupling pin shown in FIG. 4.

DESCRIPTION OF THE PREFERRED EMBODIMENTS

Figure 1:
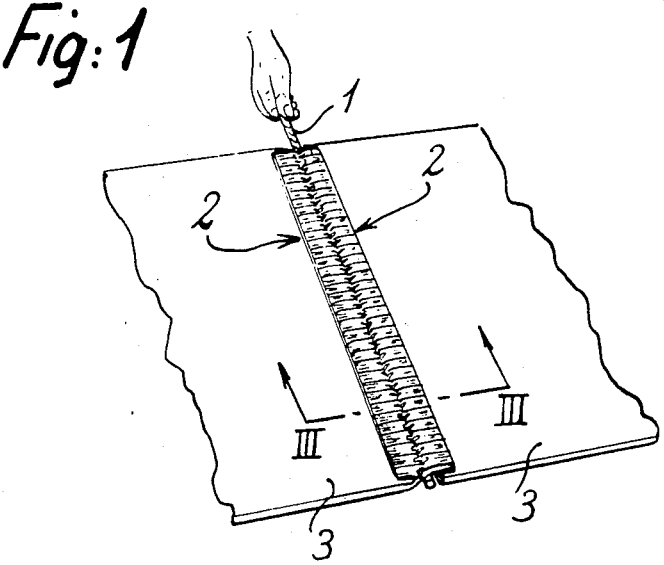
FIG. 1 is a view in perspective which illustrates the joining of the two ends of a conveyor belt by means of two opposite rows of coupling staples and a pin, the design function of said pin being to effect coupling and articulation of said opposite rows of staples.
Figure 2:
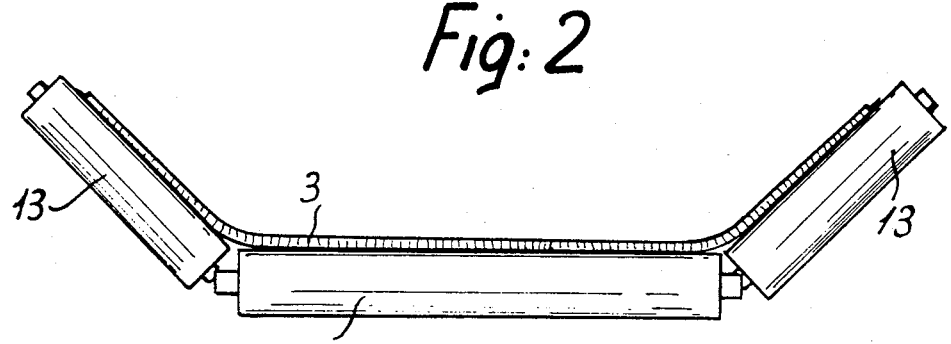
FIG. 2 is a schematic transverse sectional view to a different scale showing a conveyor belt during use on a conveyor.
Figure 3:
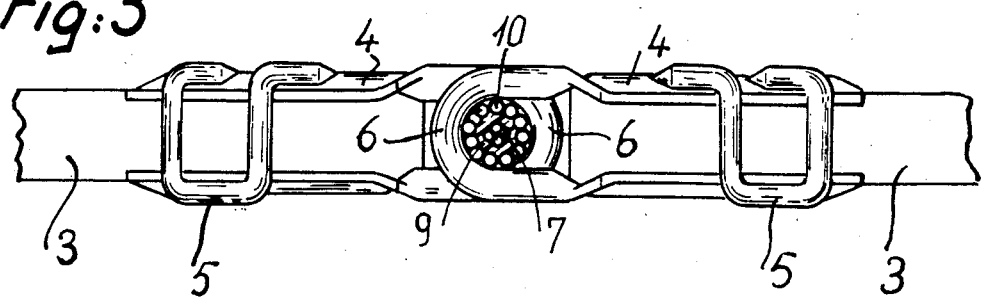
FIG. 3 is a longitudinal sectional view to a different scale which shows the coupling of FIG. 1 and corresponds to a cross-section taken along line III—III of FIG. 1.

As shown in FIG. 1, the flexible hinge-pin 1 in accordance with the invention is intended to join together two rows 2 of metallic fastening staples placed astride the ends 3 of a conveyor belt which is intended to form a closed loop. The staples 4 of the two opposite rows have the general shape of a U and are mounted astride each end of the conveyor belt. The staples are fixed in position by means of metallic clamps 5, for example. Said staples have U-shaped hinge-ends 6 which are intended to be placed in interjacent relation and assembled together by means of a coupling pin 1 which is inserted in the passageway formed by the different hinge-ends after interengagement of these latter (as shown in FIGS. 1 and 3). Said coupling pin is flexible in order to permit inward bending of the conveyor belt in the transverse direction as shown in FIG. 2.

In the embodiment illustrated in FIG. 4, the coupling pin 1 in accordance with the invention is constituted by the combination of three concentric elements, namely:

a central core consisting of a metallic cable 7 formed by twisting a number of multiple strands 8 of wire, an intermediate plastic sheath 9, and finally an outer jacket 10 formed by twisting a number of wires 11 of steel or any other suitable metal.

It should be noted that, in the example shown in the drawings, the direction of twist of the outer jacket is reverse to the direction of twist of the central cable 7. However, the outer jacket could also have the same direction of twist as the central cable 7.

In practice, the intermediate sheath 9 is formed by direct extrusion around the central cable 7 and the outer jacket 10 is then twisted around said sheath, with the result that the steel wires 11 of said jacket are impressed on the outer surface of said sheath, thus forming helical grooves 12 in said sheath. The plastic material employed for the formation of the intermediate sheath 9 by extrusion can be polyethylene, for example.

By virtue of its structural design, the coupling pin has the requisite degree of flexibility to enable the conveyor belt 3 to bend inwards in the shape of a trough on the guide rollers 13 of a conveyor as shown in FIG. 2. However, said coupling pin has very high mechanical strength and is consequently capable of transmitting the desired tractive forces between the two ends of a conveyor belt.

However, the presence of the outer jacket 10 is in no way liable to impair the flexibility of the coupling pin. In point of fact, the construction of said pin in the form of two separate and distinct metallic elements consisting of inner core and outer jacket endows the pin with enhanced flexibility in the transverse direction since these elements are capable of sliding with respect to each other while they are being subjected to flexural deformation. Furthermore, the interposition of the intermediate plastic sheath 9 facilitates this relative displacement in sliding motion while avoiding any danger of seizure between the two elements under consideration as well as the disadvantages which would otherwise have resulted from seizure, namely a reduction in flexibility of the coupling pin and a potential danger of premature wear of its components. The diagram of FIG. 6 illustrates the sliding motion which can take place under these conditions and in the case of a predetermined strand 11 of the outer jacket 10. Thus the strand 11 can take up successively the positions 11b and 11c by reason of the difference in flexural deformation of said strand with respect to the flexural deformation of the inner core 7.

In an advantageous embodiment, the intermediate sheath 9 is formed of plastic material such as, for example, polyethylene filled with a grease which is capable of migrating outwards under the action of the deformations to which said sheath is subsequently subjected. The grease under consideration can have a base either of silicone or of molybdenum bisulfide. In this case the coupling pin in accordance with the invention is capable of lubricating the pin surface which is in contact with the hinge-ends 6 of the coupling staples. In fact, the stresses and deformations exerted on the intermediate sheath 9 during the various flexural deformations of the coupling pin give rise to migration of the grease contained within said sheath 10. Under these conditions, said grease is caused to flow between the single strands 11 of the outer jacket 10 and therefore to lubricate the outer surface of said jacket. In practice, a very small quantity of grease is sufficient to ensure the desired lubrication, with the result that a flexible pin in accordance with the invention is capable of producing good lubrication over a long period of time.

The lubrication thus provided accordingly makes it possible to forestall any danger of seizure of the hinge-ends 6 of the coupling staples. A further advantage of this lubrication lies in the fact that it facilitates the articulation of the hinge-ends 6, thus preventing excessively rapid wear of the coupling pin.

FIG. 5 illustrates another embodiment in which the structure of the corresponding flexible pin differs from the preceding embodiment solely in the fact that, instead of being constituted by a cable 7, the central core consists of a metallic spring 14. In regard to the other components of said coupling pin 1a, they are identical with those proposed earlier since they consist of an outer jacket 10a which is identical with the jacket 10 and an intermediate sheath 9a of plastic material which is identical with the sheath 9 of FIG. 4.

Preferably, the plastic material constituting said sheath is also filled with grease which is capable of migrating to the exterior. Furthermore, as in the case of the cable 7 of the embodiment shown in FIG. 4, the direction of twist of said spring is opposite to the direction of twist of the single strands 11 of the outer jacket 10 of the corresponding cable.

In fact, the reversal of these two directions of twist is an essential condition for ensuring that the deformations sustained by the inner core and by the outer jacket exert on the intermediate sheath 9 or 9a stresses of a suitable nature for inducing migration of the grease contained within the sheath. Although the inner core of the cable shown in FIG. 5 is constituted by a metallic spring, the same result as in the embodiment of FIG. 4 is therefore obtained.

It should be pointed out that the single strands of the outer jacket 7 or 7a of each embodiment described in the foregoing can have a cross-section other than circular. By way of example, their cross-section can have a shape such that the surface of said jacket is practically smooth so as to form an excellent bearing surface for the hinge-ends 6 of the coupling staples. Furthermore, the flexible coupling pin in accordance with the invention is not limited to the two embodiments which are illustrated in FIGS. 4 and 5 and which have been described solely by way of example.

What is claimed is:

1. A flexible pin for coupling and articulation of two complementary rows of fastening staples of a conveyor belt or the like, comprising a flexible central core, an intermediate sheath of flexible plastic material on the core and completely surrounding the core, and an outer jacket of tubular shape and formed by twisting at least one strand of wire about the intermediate sheath, said central core being twisted in the opposite direction from the wire of the outer jacket, the flexible plastic material of the intermediate sheath being filled with grease and being in contact both with the central core and with the outer jacket.

2. A pin as claimed in claim 1, in which said central core is a metal cable.

3. A pin as claimed in claim 1, in which said central core is a metal coil spring.

* * * * *